United States Patent
Han (10) Patent No.: US 9,863,339 B2
(45) Date of Patent: Jan. 9, 2018

(54) APPARATUS AND METHOD FOR CONTROLLING ENGINE

(71) Applicant: HYUNDAI MOTOR COMPANY, Seoul (KR)

(72) Inventor: Kyoungchan Han, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 147 days.

(21) Appl. No.: 14/880,055

(22) Filed: Oct. 9, 2015

(65) Prior Publication Data

US 2016/0363073 A1 Dec. 15, 2016

(30) Foreign Application Priority Data

Jun. 15, 2015 (KR) ........................ 10-2015-0084249

(51) Int. Cl.
| | |
|---|---|
| *F02D 41/00* | (2006.01) |
| *F02D 41/18* | (2006.01) |
| *F02D 41/14* | (2006.01) |
| *F02D 41/24* | (2006.01) |
| *F02D 41/40* | (2006.01) |
| *F02D 35/02* | (2006.01) |
| *F02D 41/38* | (2006.01) |

(52) U.S. Cl.
CPC ....... *F02D 41/0007* (2013.01); *F02D 35/023* (2013.01); *F02D 41/1497* (2013.01);
(Continued)

(58) Field of Classification Search
CPC ............. F02D 41/0007; F02D 41/1497; F02D 41/2451; F02D 35/023; F02D 41/403;
(Continued)

(56) References Cited

U.S. PATENT DOCUMENTS

| | | | |
|---|---|---|---|
| 5,632,257 A * | 5/1997 | Machida | F02D 35/023 123/435 |
| 6,885,932 B2 * | 4/2005 | Liu | G01M 15/11 123/357 |

(Continued)

FOREIGN PATENT DOCUMENTS

| | | | |
|---|---|---|---|
| JP | 2008248811 A | * | 10/2008 |
| JP | 4396006 B2 | | 1/2010 |

(Continued)

OTHER PUBLICATIONS

English translation of JP 2008248811 A.*

*Primary Examiner* — Joseph Dallo
(74) *Attorney, Agent, or Firm* — McDermott Will & Emery LLP (57) ABSTRACT

An engine control apparatus includes an engine information detector for detecting engine information including an engine speed, a fuel amount, an air amount, a boost pressure, injection timing, an intake air temperature, an atmospheric pressure, and an atmospheric temperature, a combustion pressure sensor for detecting a combustion pressure of an engine, and a controller performing an IMEP control for adjusting a main injection amount and a combustion noise control for adjusting a pilot injection amount by using the engine information detected by the engine information detector and the combustion pressure detected by the combustion pressure sensor, and calculating a final main injection correction amount and a final pilot injection correction amount by using an IMEP pilot correction amount and an IMEP correction amount outputted from the IMEP control and a combustion noise correction amount outputted from the combustion noise control.

18 Claims, 6 Drawing Sheets

(52) U.S. Cl.
CPC ....... *F02D 41/182* (2013.01); *F02D 41/2451* (2013.01); *F02D 41/403* (2013.01); *F02D 41/3836* (2013.01); *F02D 2200/025* (2013.01); *Y02T 10/144* (2013.01); *Y02T 10/44* (2013.01)

(58) Field of Classification Search
CPC ............... F02D 41/182; F02D 41/3836; F02D 2200/025; F02M 26/05; F02M 26/06
See application file for complete search history.

(56) References Cited

U.S. PATENT DOCUMENTS

| | | | |
|---|---|---|---|
| 8,171,914 B2* | 5/2012 | Atzler | .................. F02D 35/023 123/435 |
| 2004/0118116 A1 | 6/2004 | Beck et al. | |
| 2005/0033501 A1* | 2/2005 | Liu | ........................ G01M 15/11 701/111 |
| 2009/0254262 A1* | 10/2009 | Kweon | ................. F02D 35/023 701/104 |
| 2010/0037861 A1* | 2/2010 | Atzler | ................... F02D 35/023 123/435 |
| 2010/0089362 A1* | 4/2010 | Haskara | ................ F02D 35/023 123/435 |
| 2011/0172899 A1 | 7/2011 | Haskara et al. | |
| 2012/0277970 A1* | 11/2012 | Rayl | ..................... F02D 35/023 701/102 |

FOREIGN PATENT DOCUMENTS

| | | |
|---|---|---|
| JP | 4914807 B2 | 4/2012 |
| KR | 10-2013-0137395 A | 12/2013 |
| KR | 10-2014-0127452 A | 11/2014 |

* cited by examiner

APPARATUS AND METHOD FOR CONTROLLING ENGINE

CROSS-REFERENCE TO RELATED APPLICATION

This application claims the benefit of priority to Korean Patent Application No. 10-2015-0084249, filed on Jun. 15, 2015, in the Korean Intellectual Property Office, the entire contents of which are incorporated herein by reference.

TECHNICAL FIELD

The present disclosure relates to an apparatus and a method for controlling an engine. More particularly, the present disclosure relates to an apparatus and a method for controlling an engine that can simultaneously control an IMEP (indicated mean effective pressure) and combustion noise by using combustion pressure detected by a combustion pressure sensor.

BACKGROUND

There are various methods for controlling torque of an engine of a vehicle (hereinafter, referred to as 'engine torque') and combustion noise generated by the engine torque. Generally, the engine torque can be controlled by a parameter of IMEP (indicated mean effective pressure). The IMEP represents torque generated by combustion.

Among methods for controlling engine torque and combustion noise, a method in which the engine torque is controlled by IMEP control (IMEP is controlled by control of a main injection amount) and the combustion noise is controlled by control of a pilot injection amount is often used.

However, if the main injection amount is controlled in order to control IMEP, the combustion noise is influenced by the main injection amount. Also, if the pilot injection amount is controlled in order to control the combustion noise, IMEP is influenced by the pilot injection amount.

As described above, the main injection amount affects the combustion noise and the pilot injection amount affects IMEP. Therefore, if a relationship between the main injection amount and the pilot injection amount for controlling the IMEP and the combustion noise is ignored, a problem may result in that control for the main injection amount or the pilot injection amount is diverged.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an engine control apparatus that can control IMEP and combustion noise by considering an interaction between a main injection amount and a pilot injection amount when the IMEP and the combustion noise are controlled through the main injection amount and the pilot injection amount.

An engine control apparatus according to an exemplary embodiment of the present disclosure may include: an engine information detector for detecting engine information including an engine speed, a fuel amount, an air amount, a boost pressure, injection timing, an intake air temperature, an atmospheric pressure, and an atmospheric temperature; a combustion pressure sensor for detecting a combustion pressure of an engine; and a controller for performing an IMEP control for adjusting a main injection amount and a combustion noise control for adjusting a pilot injection amount by using the engine information detected by the engine information detector and the combustion pressure detected by the combustion pressure sensor, and calculating a final main injection correction amount and a final pilot injection correction amount by using an IMEP pilot correction amount and an IMEP correction amount outputted from the IMEP control and a combustion noise correction amount outputted from the combustion noise control.

An IMEP injection correction amount learning map including an IMEP rail pressure map and an IMEP rotation speed map may be stored in the controller, the IMEP correction amount is calculated by summing an IMEP rail pressure correction amount and an IMEP rotation speed correction amount according to the engine information and the combustion pressure stored in the IMEP injection correction amount learning map, and the IMEP pilot correction amount is calculated by multiplying the IMEP rail pressure correction amount by a correction coefficient.

When a correction amount learning condition determined by the engine information and the combustion pressure is satisfied, the controller may modify the IMEP rail pressure correction amount and the IMEP rotation speed correction amount stored in the IMEP injection correction amount learning map, and calculates an IMEP pilot correction amount and an IMEP correction amount from the modified IMEP rail pressure correction amount and the modified IMEP rotation speed correction amount.

The controller may calculate an IMEP error by comparing an IMEP target value calculated from the engine information to an IMEP measured value converted from the combustion pressure detected by the combustion pressure sensor, calculate an IMEP model value from the IMEP error, calculate an IMEP rail pressure difference by comparing the IMEP model value to an IMEP rail pressure correction amount stored in the IMEP rail pressure map, and modify the IMEP rail pressure correction amount from the IMEP rail pressure difference.

The controller may extract an IMEP rotation speed correction amount stored in the IMEP rotation speed map according to the engine information and the combustion pressure, calculate an IMEP rotation speed difference by comparing the IMEP model value, the modified IMEP rail pressure correction amount, and the IMEP rotation speed correction amount, and modify the IMEP rotation speed correction amount from the IMEP rotation speed difference.

A combustion noise injection correction amount learning map including a combustion noise rail pressure map and a combustion noise rotation speed map may be stored in the controller, and the controller may perform the combustion noise control that calculates a combustion noise correction amount by summing the combustion noise rail pressure correction amount stored in the combustion noise injection correction amount learning map and the combustion noise rotation speed correction amount stored in the combustion noise rotation speed map.

When the correction amount learning condition determined by the engine information and the combustion pressure is satisfied, the controller may modify the combustion noise rail pressure correction amount and the combustion noise rotation speed correction amount stored in the combustion noise injection correction amount learning map, and calculate a combustion noise correction amount from the modified combustion noise rail pressure correction amount and the modified rotation speed.

The controller may calculate a combustion noise error by comparing a combustion noise target value calculated from the engine information to a combustion noise measured value calculated from the combustion pressure detected by the combustion pressure sensor, calculate a combustion noise model value from the combustion noise error, calculate a combustion noise rail pressure difference by comparing the combustion noise model value to an IMEP rail pressure correction amount stored in the IMEP the rail pressure map, and modify the combustion noise rail pressure correction amount from the combustion noise rail pressure difference.

The controller may extract a combustion noise rotation speed correction amount stored in the combustion noise rotation speed map according to the engine information and the combustion pressure, calculate a combustion noise rotation speed difference by comparing the combustion noise model value, the modified combustion noise rail pressure correction amount, and the combustion noise rotation speed correction amount, and modify the combustion noise rotation speed correction amount from the combustion noise rotation speed difference.

The controller may calculate a pilot correction amount by summing the IMEP pilot correction amount and the combustion noise correction amount, calculate a combustion noise influence ratio from the IMEP correction amount and the pilot correction amount, and calculate the final pilot injection correction amount from the combustion noise influence ratio and the pilot correction amount.

The controller may calculate a pilot correction amount by summing the IMEP pilot correction amount and the combustion noise correction amount, calculate an IMEP influence ratio from the IMEP correction amount and the pilot correction amount, and calculate the final main injection correction amount from the IMEP influence ratio and the IMEP correction amount.

An engine control method according to another exemplary embodiment of the present disclosure may include: detecting engine information including an engine speed, a fuel amount, an air amount, a boost-pressure, injection timing, an intake air temperature, an atmospheric pressure, and an atmospheric temperature; detecting combustion pressure of an engine; performing, by a controller, IMEP control for adjusting a main injection amount and a combustion noise control for adjusting a pilot injection amount according to the engine information and the combustion pressure; and performing, by the controller, concurrent control that calculates a final main injection correction amount and a final pilot injection correction amount from an IMEP pilot correction amount and an IMEP correction amount outputted from the IMEP control and a combustion noise correction amount outputted from the combustion noise control when an IMEP control condition is satisfied.

An IMEP injection correction amount learning map including an IMEP rail pressure map and an IMEP rotation speed map is stored in the controller, and the IMEP control may include: calculating an IMEP target value from the engine information; converting the combustion pressure to an IMEP measured value; calculating an IMEP error by comparing the IMEP target value to the IMEP measured value; determining whether the IMEP control condition is satisfied from the engine information; and determining whether a correction amount learning condition is satisfied from the engine information, and when the IMEP control condition is satisfied and the correction amount learning condition is not satisfied, may further include calculating the IMEP correction amount by summing an IMEP rail pressure correction amount stored in the IMEP injection correction amount learning map and the IMEP rotation speed correction amount according to the engine information and the combustion pressure, and calculating the IMEP pilot correction amount by multiplying the IMEP rail pressure correction amount by a correction coefficient.

When the IMEP control condition is satisfied and the correction amount learning condition is satisfied from the engine information and the combustion pressure, modifying the IMEP rail pressure correction amount and the IMEP rotation speed correction amount stored in the IMEP injection correction amount learning map, and calculating an IMEP pilot correction amount and an IMEP correction amount from the modified IMEP rail pressure correction amount and the modified IMEP rotation speed correction amount, may be further included.

The engine control method may further include calculating an IMEP model value from the IMEP error, calculating an IMEP rail pressure difference by comparing the IMEP model value to the IMEP rail pressure correction amount stored in IMEP the rail pressure map, and modifying the IMEP rail pressure correction amount from the IMEP rail pressure difference.

A combustion noise injection correction amount learning map including a combustion noise rail pressure map and a combustion noise rotation speed map is stored in the controller.

The combustion noise control may include: calculating a combustion noise target value from the engine information; converting the combustion pressure to a combustion noise measured value; calculating a combustion noise error by comparing the combustion noise target value to the combustion noise measured value; determining whether a combustion noise control condition is satisfied from the engine information; and determining whether a correction amount learning condition is satisfied from the engine information, and when the combustion noise control condition is satisfied and the correction amount learning condition is not satisfied, may further include calculating a combustion noise correction amount by summing the combustion noise rail pressure correction amount and the combustion noise rotation speed correction amount stored in the combustion noise injection correction amount learning map according to the engine information and the combustion pressure.

The engine control method, when the combustion noise control condition is satisfied and the correction amount learning condition is satisfied, may further include modifying the combustion noise rail pressure correction amount and the combustion noise rotation speed correction amount stored in the combustion noise injection correction amount learning map, and calculating the combustion noise correction amount from the modified combustion noise rail pressure correction amount and the modified combustion noise rotation speed correction amount.

The engine control method may further include: calculating a combustion noise model value from the combustion noise error; calculating a combustion noise rail pressure difference by comparing the combustion noise model value to the combustion noise rail pressure correction amount stored in the combustion noise rail pressure map; and modifying the combustion noise rail pressure correction amount from the combustion noise rail pressure difference.

The concurrent control may include: calculating a pilot correction amount by summing the IMEP pilot correction amount and the combustion noise correction amount; calculating an IMEP influence ratio from the IMEP correction amount and the pilot correction amount; calculating a combustion noise influence ratio from the IMEP correction amount and the pilot correction amount; calculating the final pilot injection correction amount from the combustion noise influence ratio and the pilot correction amount; and calculating the final main injection correction amount from the IMEP influence ratio and the IMEP correction amount.

The final main injection correction amount may be calculated by multiplying the IMEP correction amount by the IMEP influence ratio, and the final pilot injection correction amount may be calculating by multiplying the pilot correction amount by the combustion noise influence ratio.

According to an exemplary embodiment of the present disclosure, it is possible to control considering an interaction between a main injection amount and a pilot injection amount when IMEP and combustion noise is controlled by the main injection amount and the pilot injection amount.

Further, since an MEP control and a combustion noise control are controlled by considering the interaction between the main injection amount and the pilot injection amount, the IMEP and the combustion noise can be stably controlled.

BRIEF DESCRIPTION OF THE DRAWINGS

The attached drawings illustrate exemplary embodiments of the present disclosure, and are provided for describing the present disclosure in more detail, but not for limiting technical aspects of the present disclosure.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts not related to the description of the exemplary embodiments are not shown to make the description clear, and like reference numerals designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

Hereinafter, an engine control apparatus according to an exemplary embodiment of the present disclosure will be described in detail with reference to accompanying drawings.

Figure 1:
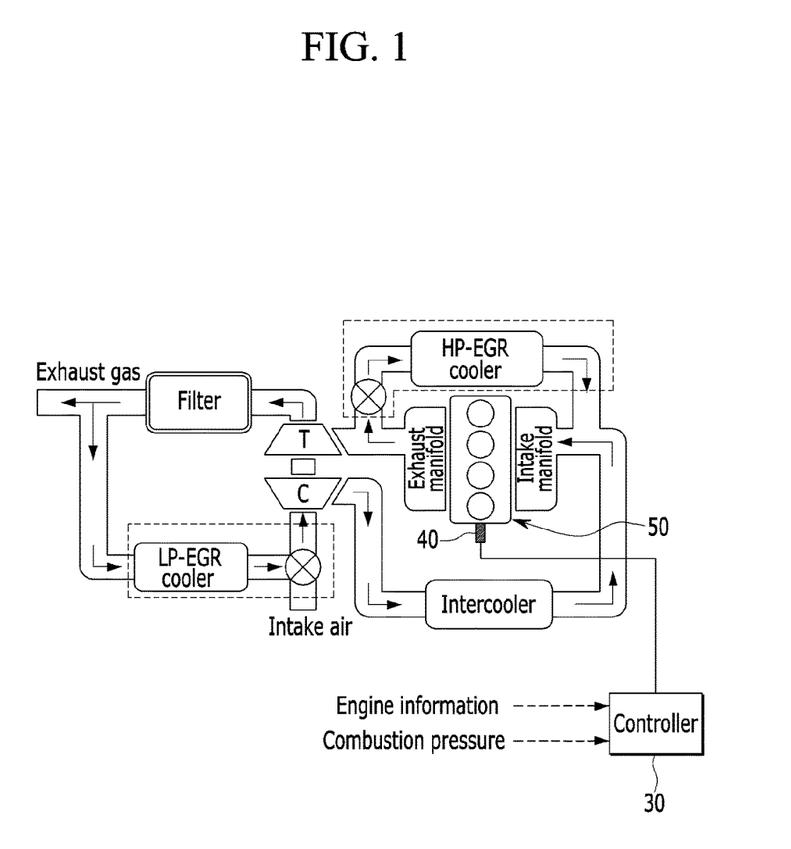
FIG. 1 is a schematic view illustrating an engine control apparatus according to an exemplary embodiment of the present disclosure.
Figure 2:
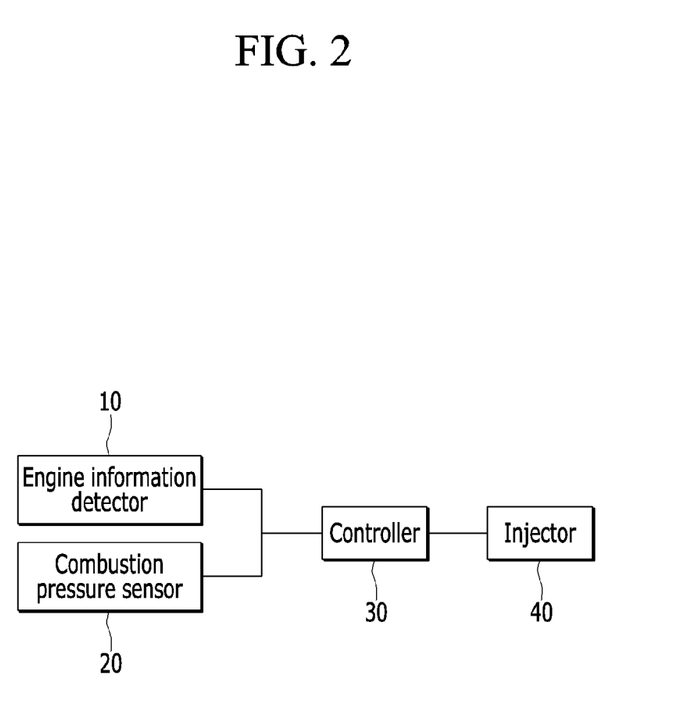
FIG. 2 is a block diagram illustrating an engine control apparatus according to an exemplary embodiment of the present disclosure.

FIG. 1 is a schematic view illustrating an engine control apparatus according to an exemplary embodiment of the present disclosure. FIG. 2 is a block diagram illustrating an engine control apparatus according to an exemplary embodiment of the present disclosure.

As shown in FIG. 1 and FIG. 2, an engine control apparatus according to an exemplary embodiment of the present disclosure includes an engine information detector 10 detecting engine information, a combustion pressure sensor 20 detecting combustion pressure of an engine 50, and a controller 30 performing IMEP control through a main injection amount and combustion noise control through a pilot injection amount by using the engine information and the combustion pressure. The main injection and the pilot injection is performed by an injector 40 disposed at a combustion chamber.

The engine information detected by the engine information detector 10 may include engine speed, fuel amount, air amount, boost pressure, injection timing, intake air temperature, atmospheric pressure, and atmospheric temperature. The engine information is supplied to the controller 30.

The combustion pressure of the engine detected by the combustion pressure sensor 20 is supplied to the controller 30.

The controller 30 can be realized by one or more processors activated by a predetermined program, and the predetermined program can be programmed to perform each step of an engine control method according to an embodiment of this disclosure.

Output values through the IMEP control are an IMEP pilot correction amount (delta_q_Pilot_IMEP) and an IMEP correction amount (delta_IMEP). The IMEP pilot correction amount (delta_q_Pilot_IMEP) and the IMEP correction amount (delta_IMEP) are used for adjusting variation of combustion noise according to adjustment of the main injection amount when the IMEP control is performed by adjustment of the main injection amount.

An output value through the combustion noise control is a combustion noise correction amount (delta_NOISE). The combustion noise correction amount is used for adjusting variation of IMEP according to adjustment of the pilot injection amount when the combustion noise control is performed through adjustment of the pilot injection amount.

The controller 30 outputs a final main injection correction amount (delta_q_Main_Final) and a final pilot injection correction amount (delta_q_Pilot_Final) by using the IMEP pilot correction amount (delta_q_Pilot_IMEP) and the IMEP correction amount (delta_IMEP) outputted through the IMEP control and the combustion noise correction amount (delta_NOISE) outputted through the combustion noise control. Through the specification and claims, a process that calculates and outputs the final main injection correction amount (delta_q_Main_Final) and the final pilot injection correction amount (delta_q_Pilot_Final) by using the IMEP pilot correction amount (delta_q_Pilot_IMEP), the IMEP correction amount (delta_IMEP), and the combustion noise correction amount (delta_NOISE) is referred to as concurrent control.

Hereinafter, the engine control method by the controller 30 will be described in detail with reference to accompanying drawings.

Figure 3:
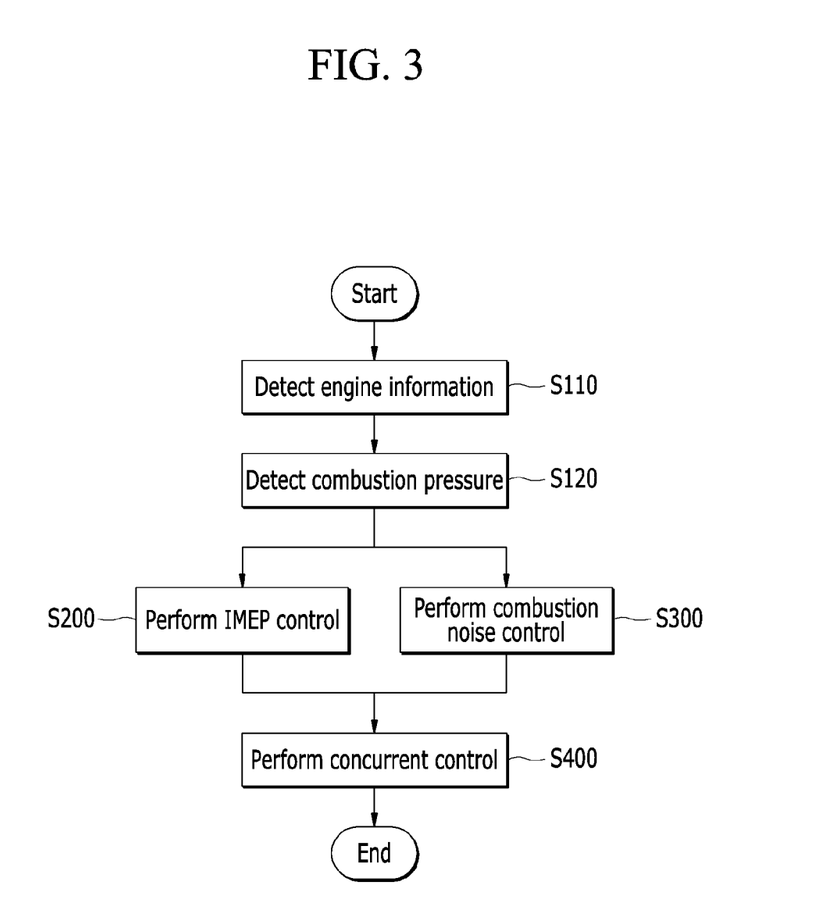
FIG. 3 is a flowchart illustrating an engine control method according to an exemplary embodiment of the present disclosure.

FIG. 3 is a flowchart illustrating an engine control method according to an exemplary embodiment of the present disclosure.

As shown in FIG. 3, the engine information detector 10 detects the engine information including the engine speed, the fuel amount, the air amount, the boost pressure, the injection timing, the intake air temperature, the atmospheric pressure, and the atmospheric temperature at step S110. The engine information detected by the engine information detector 10 is transmitted to the controller 30.

The combustion pressure sensor 20 detects the combustion pressure of the engine at step S120. The combustion pressure detected by the combustion pressure sensor 20 is transmitted to the controller 30.

The controller 30 performs IMEP control at step S200 and combustion noise control at step S300 by using the engine information detected by the engine information detector 10 and the combustion pressure detected by the combustion pressure sensor 20.

Hereinafter, an exemplary IMEP control method will be described in detail.

Figure 4:
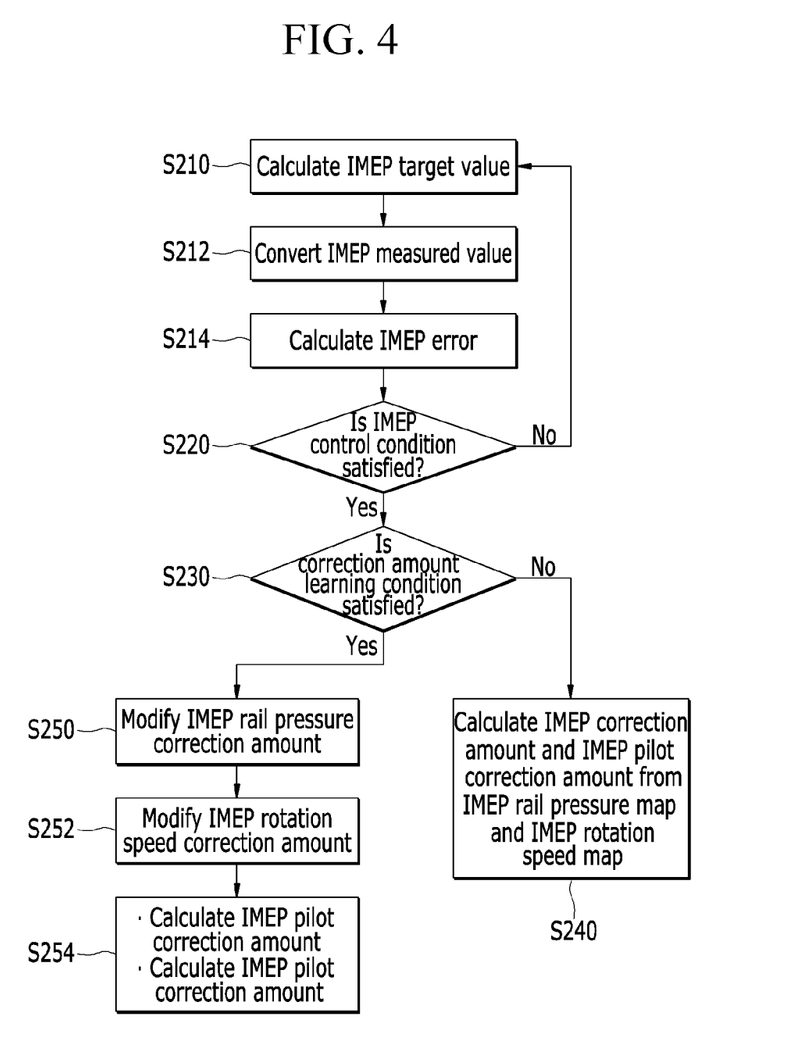
FIG. 4 is a flowchart illustrating an IMEP control method according to an exemplary embodiment of the present disclosure.

FIG. 4 is a flowchart illustrating an IMEP control method according to an exemplary embodiment of the present disclosure.

Referring to FIG. 4, the controller 30 calculates an IMEP target value (IMEP_Target) from the engine information at step S210.

The controller 30 converts the combustion pressure detected by the combustion pressure sensor 20 to an IMEP measured value at step S212. The IMEP measured value is a value of which the combustion pressure detected by the combustion pressure sensor 20 is converted to IMEP.

The controller 30 calculates an IMEP error (IMEP_Error) by comparing the IMEP target value (IMEP_Target) calculated from the engine information to the IMEP measured value (IMEP_Convert) converted from the combustion pressure at step S214. The IMEP error (IMEP_Error) may be a difference between the IMEP target value (IMEP_Target) and the IMEP measured value (IMEP_Convert).

The controller 30 calculates an IMEP model value (IMEP_delta_q_model) for making the IMEP error (IMEP_Error) be zero. The IMEP model value (IMEP_delta_q_model) may be experimentally determined from a relationship between the IMEP target value and the IMEP measured value.

The controller 30 determines whether an IMEP control condition is satisfied at step S220. The IMEP control condition may be determined from the engine information detected by the engine information detector 10. For example, the controller determines that the IMEP control condition is satisfied when the engine speed, the fuel amount, the air amount, the boost pressure, the injection timing, the intake air temperature, the atmospheric pressure, the atmospheric temperature, and the combustion pressure satisfy predetermined values.

When the IMEP control condition is satisfied, the controller 30 determines whether a correction amount learning condition is satisfied at step S230. The correction amount learning condition may be determined from the engine information. For example, when a variation of the engine rotation speed is within a predetermined value, a variation of fuel amount is within a predetermined value, and a variation of intake air temperature is within a predetermined value, the correction amount learning condition is satisfied.

When the correction amount learning condition is not satisfied, the controller 30 calculates the IMEP correction amount and the IMEP pilot correction amount from an IMEP injection correction amount learning map including an IMEP rail pressure map (IMEP_MAP_Rail/Q) and an IMEP rotation speed map (IMEP_MAP_N/Q) at step S240.

The IMEP injection correction amount learning map including the IMEP rail pressure map (IMEP_MAP_Rail/Q) and the IMEP rotation speed map (IMEP_MAP_N/Q) is stored in the controller 30. Through the specification and claims, a rail pressure may be a pressure of a common rail in which fuel pumped by a high pressure pump is temporarily stored in a common rail engine.

The IMEP rail pressure map (IMEP_MAP_Rail/Q) includes a main injection amount according to the rail pressure. The IMEP rail pressure map (IMEP_MAP_Rail/Q) is used for correcting deviation of an injector 40.

The IMEP rotation speed map (IMEP_MAP_N/Q) includes the main injection amount according to the engine speed. The IMEP rotation speed map (IMEP_MAP_N/Q) is used for correcting deviation of the engine.

The IMEP correction amount (delta_IMEP) is calculated by summing an IMEP rail pressure correction amount (IMEP_delta_q_Rail/Q) stored in the IMEP rail pressure map and an IMEP rotation speed correction amount (IMEP_delta_q_N/Q) stored in the IMEP rotation speed map according to the engine information and the combustion pressure.

The IMEP pilot correction amount (delta_q_Pilot_IMEP) is calculated by multiplying the IMEP rail pressure correction amount by a correction coefficient. The correction coefficient may be determined from a current main injection amount, a current pilot injection amount, and a current rail pressure before the IMEP control is performed.

In the step S230, when the correction amount learning condition is satisfied, the controller 30 modifies the IMEP rail pressure correction amount (IMEP_delta_q_Rail/Q) and the IMEP rotation speed correction amount (IMEP_delta_q_N/Q) stored in the IMEP injection correction amount learning map at step S250 and S252.

An exemplary modification process of the IMEP rail pressure map is as follows.

The controller 30 extracts the IMEP rail pressure correction amount (IMEP_delta_q_Rail/Q) according to the engine information and the combustion pressure in the IMEP rail pressure map. The controller 30 calculates an IMEP rail pressure difference (IMEP_delta_q_*diff*_Rail/Q) by comparing the IMEP model value (IMEP_delta_q_model) to the IMEP rail pressure correction amount (IMEP_delta_q_Rail/Q). The controller 30 repeatedly calculates the EP rail pressure difference (IMEP_delta_q_*diff*_Rail/Q) for a predetermined time, such that it calculates a modified IMEP rail pressure correction amount (IMEP_delta_q_Rail/Q_new).

When the IMEP rail pressure correction amount (IMEP_delta_q_Rail/Q) is modified, the controller 30 extracts the IMEP rotation speed correction amount (IMEP_delta_q_N/Q) according to the engine information and the combustion pressure in the IMEP rotation speed map (IMEP_MAP_N/Q). The controller 30 calculates an IMEP rotation speed difference (IMEP_delta_q_*diff*_N/Q) by comparing the IMEP model value (IMEP_delta_q_model), the modified IMEP rail pressure correction amount (IMEP_delta_q_Rail/Q_new), and the IMEP rotation speed correction amount (IMEP_delta_q_N/Q).

The IMEP rotation speed difference (IMEP_delta_q_*diff*_N/Q) can be calculated from the following Equation 1.

$$\text{IMEP\_delta\_}q\_\textit{diff}\_N/Q = \text{IMEP\_delta\_}q\_\text{model} - (\text{IMEP\_delta\_}q\_\text{Rail}/Q\_\text{new} + \text{IMEP\_delta\_}q\_N/Q) \quad \text{[Equation 1]}$$

The controller 30 calculates the IMEP pilot correction amount (delta_q_Pilot_IMEP) and the IMEP correction amount (delta_IMEP) from the modified IMEP rail pressure correction amount (IMEP_delta_q_Rail/Q_new) and the modified IMEP rotation speed correction amount (IMEP_delta_q_N/Q_new) at step S254.

The controller 30 calculates the IMEP correction amount (delta_IMEP) by summing the modified IMEP rail pressure correction amount (IMEP_delta_q_Rail/Q_new) and the modified IMEP rotation speed correction amount (IMEP_delta_q_N/Q_new).

The controller 30 calculates the IMEP pilot correction amount (delta_q_Pilot_IMEP) by multiplying the modified IMEP rail pressure correction amount (IMEP_delta_q_Rail/Q_new) by a correction coefficient. The correction coefficient may be determined from a current main injection amount, a current pilot injection amount, and a current rail pressure before the IMEP control is performed.

An exemplary combustion noise control method will be described in detail.

Figure 5:
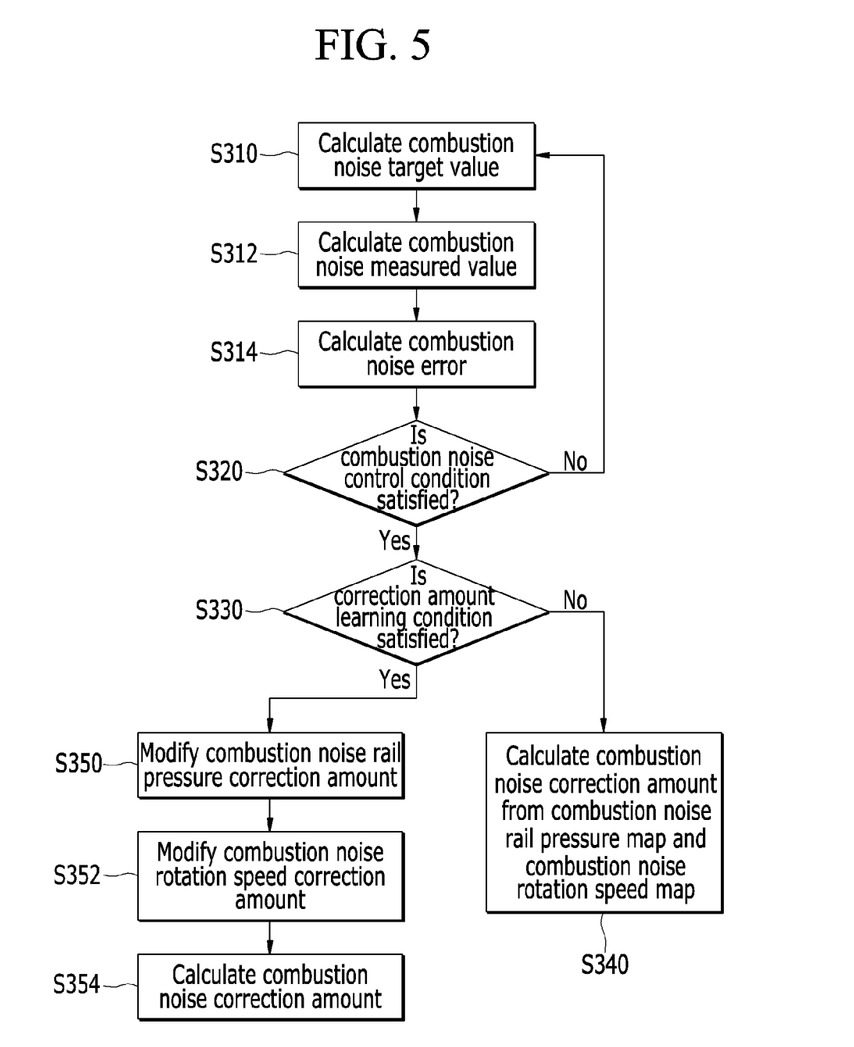
FIG. 5 is a flowchart illustrating a combustion noise control method according to an exemplary embodiment of the present disclosure.

FIG. 5 is a flowchart illustrating a combustion noise control method according to an exemplary embodiment of the present disclosure.

Referring to FIG. 5, the controller 30 calculates a combustion noise target value (NOISE_Target) from the engine information at step S310.

The controller 30 converts the combustion pressure detected by the combustion pressure sensor 20 to a combustion noise measured value at step S312. The combustion noise measured value is a value of which the combustion pressure detected by the combustion pressure sensor 20 is converted to combustion noise.

The controller 30 calculates a combustion noise error (NOISE_Error) by comparing the combustion noise target value (NOISE_Target) calculated from the engine information to the combustion noise measured value (NOISE_Convert) detected by the combustion pressure sensor 20 at step S314. The combustion noise error (NOISE_Error) may be a difference between the combustion noise target value (NOISE_Target) and the combustion noise measured value (NOISE_Convert).

The controller 30 calculates a combustion noise model value (NOISE_delta_q_model) for making the combustion noise error (NOISE_Error) be zero. The combustion noise model value (NOISE_delta_q_model) may be experimentally determined from a relationship between the combustion noise target value and the combustion noise measured value.

The controller 30 determines whether a combustion noise control condition is satisfied at step S320. The combustion noise control condition may be determined from the engine information detected by the engine information detector 10. For example, the controller determines that the IMEP control condition is satisfied when the engine speed, the fuel amount, the air amount, the boost pressure, the injection timing, the intake air temperature, the atmospheric pressure, the atmospheric temperature, and the combustion pressure satisfy predetermined values.

When the combustion noise control condition is satisfied, the controller 30 determines whether a correction amount learning condition is satisfied at step S330. The correction amount learning condition may be determined from the engine information. For example, when a variation of the engine rotation speed is within a predetermined value, a variation of fuel amount is within a predetermined value, and a variation of intake air temperature is within a predetermined value, the correction amount learning condition is satisfied.

When the correction amount learning condition is not satisfied, the controller 30 calculates a combustion noise correction amount from a combustion noise injection correction amount learning map including a combustion noise rail pressure map (NOISE_MAP_Rail/Q) and a combustion noise rotation speed map (NOISE_MAP_N/Q) at step S340.

The combustion noise injection correction amount learning map including the combustion noise rail pressure map (NOISE_MAP_Rail/Q) and the combustion noise rotation speed map (NOISE_MAP_N/Q) is stored in the controller 30.

The combustion noise rail pressure map (NOISE_MAP_Rail/Q) includes a pilot injection amount according to the rail pressure. The combustion noise rail pressure map (NOISE_MAP_Rail/Q) is used for correcting deviation of the injector 40.

The combustion noise rotation speed map (NOISE_MAP_N/Q) includes the main injection amount according to the engine speed. The combustion noise rotation speed map (NOISE_MAP_N/Q) is used for correcting deviation of the engine.

The combustion noise correction amount (delta_NOISE) is calculated by summing a combustion noise rail pressure correction amount (NOISE_delta_q_Rail/Q) stored in the combustion noise rail pressure map and the combustion noise rotation speed correction amount (NOISE_delta_q_N/Q) stored in the combustion noise rotation speed map according to the engine information and the combustion pressure.

In the step S330, when the correction amount learning condition is satisfied, the controller 30 modifies the combustion noise rail pressure correction amount (NOISE_delta_q_Rail/Q) and the combustion noise rotation speed correction amount (NOISE_delta_q_N/Q) stored in the combustion noise injection correction amount learning map at step S350 and S352.

An exemplary modification process of the combustion noise rail pressure map is as follow.

The controller 30 extracts the combustion noise rail pressure correction amount (NOISE_delta_q_Rail/Q) according to the engine information and the combustion pressure in the combustion noise rail pressure map. The controller 30 calculates a combustion noise rail pressure difference (NOISE_delta_q_*diff*_Rail/Q) by comparing the combustion noise model value (NOISE_delta_q_model) to the combustion noise rail pressure correction amount (NOISE_delta_q_Rail/Q) stored in the combustion noise rail pressure map.

The controller 30 repeatedly calculates the EP rail pressure difference (IMEP_delta_q_*diff*_Rail/Q) for a predetermined time, such that it calculates a modified IMEP rail pressure correction amount (IMEP_delta_q_Rail/Q_new).

When the combustion noise rail pressure correction amount (NOISE_delta_q_Rail/Q) is modified, the controller 30 extracts the combustion noise rotation speed correction amount (NOISE_delta_q_N/Q) according to the engine information and the combustion pressure in the combustion noise rotation speed map (NOISE_MAP_N/Q). The controller 30 calculates a combustion noise rotation speed difference (NOISE_delta_q_*diff*_N/Q) by comparing the combustion noise model value (NOISE_delta_q_model), the modified combustion noise rail pressure correction amount (NOISE_delta_q_Rail/Q_new), and the combustion noise rotation speed correction amount (NOISE_delta_q_N/Q).

The combustion noise rotation speed difference (NOISE_delta_q_diff_N/Q) can be calculated from following Equation 2.

NOISE_delta_q_diff_N/Q=NOISE_delta_q_model−(NOISE_delta_q_Rail/Q_new+NOISE_delta_q_N/Q) [Equation 2]

The controller 30 calculates the combustion noise correction amount (delta_NOISE) by summing the modified combustion noise rail pressure correction amount (NOISE_delta_q_Rail/Q_new) and the modified combustion noise rotation speed correction amount (NOISE_delta_q_N/Q_new) at step S354.

Hereinafter, the concurrent control method calculating the final main injection correction amount and the final pilot injection correction amount by using the IMEP pilot correction amount (delta_q_Pilot_IMEP), the IMEP correction amount (delta_IMEP), and the combustion noise correction amount (delta_q_NOISE) outputted from the IMEP control and the combustion noise control will be described.

Figure 6:
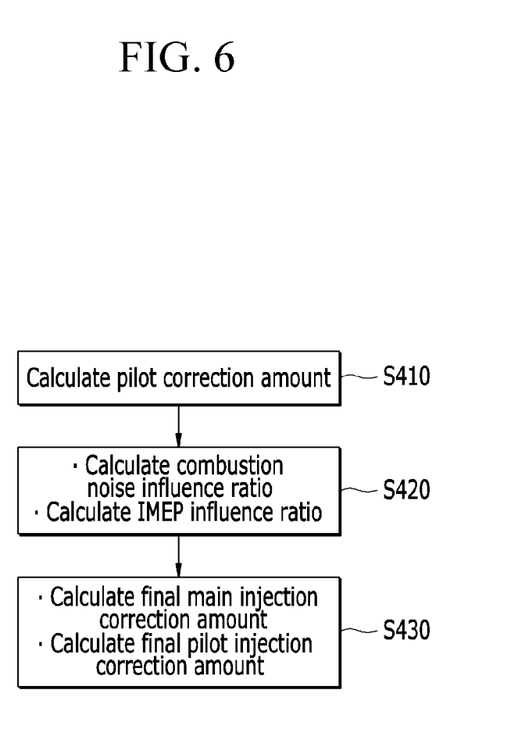
FIG. 6 is a flowchart illustrating a concurrent control method according to an exemplary embodiment of the present disclosure.

FIG. 6 is a flowchart illustrating a concurrent control method according to an exemplary embodiment of the present disclosure.

Referring to FIG. 6, the controller 30 calculates a pilot correction amount (delta_q_Pilot) at step S410. The pilot correction amount (delta_q_Pilot) is calculated by summing the combustion noise correction amount and the IMEP pilot correction amount.

As the IMEP correction amount (delta_IMEP) is increased, combustion noise is reduced. A relationship between the IMEP correction amount (delta_IMEP) and the combustion noise is expressed as the following Equation 3.

delta_IMEP*a=delta_NOISE_model [Equation 3]

Here, 'a' is a constant, and the combustion noise change amount (delta_NOISE_model) is a modeled value of a variation of the combustion noise according to a variation of the IMEP correction amount (delta_IMEP). The constant 'a' is experimentally determined from the engine speed, the fuel amount, the air amount, the boost pressure, the injection timing, the intake air temperature, the atmospheric pressure, the atmospheric temperature, the rail pressure, the IMEP, and the combustion noise.

Further, as the pilot correction amount (delta_q_Pilot) determined from summation of the IMEP pilot correction amount (delta_q_Pilot_IMEP) and the combustion noise correction amount (delta_q_NOISE) is increased, IMEP is increased. That is, a relationship between the pilot correction amount (delta_q_Pilot) and the IMEP is expressed as the following Equation 4.

delta_q_Pilot*b=delta_IMEP_model [Equation 4]

Here, 'b' is a constant, and the IMEP change amount (delta_IMEP model) is a modeled value of an IMEP variation according to a variation of the pilot correction amount (delta_q_Pilot). The constant 'b' is experimentally determined from the engine speed, the fuel amount, the air amount, the boost pressure, the injection timing, the intake air temperature, the atmospheric pressure, the atmospheric temperature, the rail pressure, the IMEP, and the combustion noise.

Furthermore, as the IMEP correction amount (delta_IMEP) is increased, the IMEP change amount (delta_IMEP_model) is increased. That is, a relationship between the IMEP correction amount (delta_IMEP) and the IMEP change amount (delta_IMEP_model) is expressed as the following Equation 5.

c*delta_IMEP=delta_IMEP_model [Equation 5]

Here, 'c' is a constant. The constant 'c' is experimentally determined from the engine speed, the fuel amount, the air amount, the boost pressure, the injection timing, the intake air temperature, the atmospheric pressure, the atmospheric temperature, the rail pressure, the IMEP, and the combustion noise.

As the pilot correction amount (delta_q_Pilot) is increased, the combustion noise change amount (delta_NOISE_model) is increased. That is, a relationship between the pilot correction amount (delta_q_Pilot) and the combustion noise change amount (delta_NOISE_model) is expressed as the following Equation 6.

d*delta_q_Pilot=delta_NOISE_model [Equation 6]

Here, the 'd' is a constant. The constant 'd' is experimentally determined from the engine speed, the fuel amount, the air amount, the boost pressure, the injection timing, the intake air temperature, the atmospheric pressure, the atmospheric temperature, the rail pressure, the IMEP, and the combustion noise.

The controller 30 calculates a combustion noise influence ratio (Ratio_Pilot_Final) from Equation 3 to Equation 6. The combustion noise influence ratio (Ratio_Pilot_Final) means a relationship between the combustion noise by the main injection amount and the combustion noise by the pilot injection amount.

The combustion noise influence ratio (Ratio_Pilot_Final) is expressed as the following Equation 7.

[(d*delta_q_Pilot)−(delta_IMEP*a)]/(d*delta_q_Pilot)=Ratio_Pilot_Final [Equation 7]

The controller 30 calculates an IMEP influence ratio (Ratio_IMEP_Final) from Equation 3 to Equation 6 at step S420. The IMEP influence ratio (Ratio_IMEP_Final) means a relationship between the IMEP by the main injection amount and the IMEP by the pilot injection amount.

The IMEP influence ratio (Ratio_IMEP_Final) is expressed as the following Equation 8.

[(c*delta_IMEP)−(delta_q_Pilot*b)]/[(c*delta_IMEP)=Ratio_IMEP_Final [Equation 8]

In Equation 3 to Equation 8, an influence on the IMEP by the main injection amount is expressed through the constant 'c'. An influence on the combustion noise by the pilot injection amount is expressed through the constant 'd'. An influence on the combustion noise by the main injection amount is expressed through the constant 'a'. An influence on the IMEP by the pilot injection amount is expressed through the constant 'b'.

Finally, the controller 30 calculates the final main injection correction amount (delta_q_Main_Final) and the final pilot injection correction amount (delta_q_Pilot_Final) by using the combustion noise influence ratio (Ratio_Pilot_Final) and the IMEP influence ratio (Ratio_IMEP_Final) at step S430.

A relationship among the final main injection correction amount (delta_q_Main_Final), the IMEP correction amount (delta_IMEP), and the IMEP influence ratio (Ratio_IMEP_Final) is expressed as the following Equation 9.

delta_q_Main_Final=delta_IMEP*Ratio_IMEP_Final [Equation 9]

A relationship among the final pilot injection correction amount (delta_q_Pilot_Final), the pilot correction amount (delta_q_Pilot), and the combustion noise influence ratio (Ratio_Pilot_Final) is expressed as the following Equation 10.

$$\text{delta\_q\_Pilot\_Final} = \text{delta\_q\_Pilot} * \text{Ratio\_Pilot\_Final} \quad \text{[Equation 10]}$$

Since the controller 30 controls the injector 40 by using the final main injection correction amount (delta_q_Main_Final) and the final pilot injection correction amount (delta_q_Pilot_Final), the controller 30 can appropriately control the IMEP and the combustion noise by the main injection amount and the pilot injection amount.

As described above, according to an exemplary embodiment of the present disclosure, it is possible to control the main injection amount and the pilot injection amount by considering an influence on the IMEP and the combustion noise by the main injection amount and the pilot injection amount.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An engine control apparatus comprising:
a plurality of sensors for detecting engine information including an engine speed, a fuel amount, an air amount, a boost pressure, injection timing, an intake air temperature, an atmospheric pressure, and an atmospheric temperature;
a combustion pressure sensor for detecting a combustion pressure of an engine; and
a controller performing an IMEP control for adjusting a main injection amount and a combustion noise control for adjusting a pilot injection amount by using the engine information detected by the plurality of sensors and the combustion pressure detected by the combustion pressure sensor, and calculating a final main injection correction amount and a final pilot injection correction amount by using an IMEP pilot correction amount and an IMEP correction amount outputted from the IMEP control and a combustion noise correction amount outputted from the combustion noise control,
wherein an IMEP injection correction amount learning map including an IMEP rail pressure map and an IMEP rotation speed map is stored in the controller, and
the IMEP correction amount is calculated by summing an IMEP rail pressure correction amount and an IMEP rotation speed correction amount according to the engine information and the combustion pressure stored in the IMEP injection correction amount learning map, and the IMEP pilot correction amount is calculated by multiplying the IMEP rail pressure correction amount by a correction coefficient.

2. The engine control apparatus of claim 1, wherein when a correction amount learning condition determined by the engine information and the combustion pressure is satisfied, the controller modifies the IMEP rail pressure correction amount and the IMEP rotation speed correction amount stored in the IMEP injection correction amount learning map, and calculates an IMEP pilot correction amount and an IMEP correction amount from the modified IMEP rail pressure correction amount and the modified IMEP rotation speed correction amount.

3. The engine control apparatus of claim 2, wherein the controller calculates an IMEP error by comparing an IMEP target value calculated from the engine information to an IMEP measured value converted from the combustion pressure detected by the combustion pressure sensor, calculates an IMEP model value from the IMEP error,
calculates an IMEP rail pressure difference by comparing the IMEP model value to an IMEP rail pressure correction amount stored in the IMEP rail pressure map, and
modifies the IMEP rail pressure correction amount from the IMEP rail pressure difference.

4. The engine control apparatus of claim 3, wherein the controller
extracts an IMEP rotation speed correction amount stored in the IMEP rotation speed map according to the engine information and the combustion pressure,
calculates an IMEP rotation speed difference by comparing the IMEP model value, the modified IMEP rail pressure correction amount, and the IMEP rotation speed correction amount, and
modifies the IMEP rotation speed correction amount from the IMEP rotation speed difference.

5. The engine control apparatus of claim 1, wherein a combustion noise injection correction amount learning map including a combustion noise rail pressure map and a combustion noise rotation speed map is stored in the controller, and
the controller performs the combustion noise control that calculates combustion noise correction amount by summing the combustion noise rail pressure correction amount stored in the combustion noise injection correction amount learning map and the combustion noise rotation speed correction amount stored in the combustion noise rotation speed map.

6. The engine control apparatus of claim 5, wherein when the correction amount learning condition determined by the engine information and the combustion pressure is satisfied,
the controller modifies the combustion noise rail pressure correction amount and the combustion noise rotation speed correction amount stored in the combustion noise injection correction amount learning map, and calculates a combustion noise correction amount from the modified combustion noise rail pressure correction amount and the modified rotation speed.

7. The engine control apparatus of claim 6, wherein the controller
calculates a combustion noise error by comparing a combustion noise target value calculated from the engine information to a combustion noise measured value calculated from the combustion pressure detected by the combustion pressure sensor, calculates a combustion noise model value from the combustion noise error,
calculates a combustion noise rail pressure difference by comparing the combustion noise model value to an IMEP rail pressure correction amount stored in the IMEP the rail pressure map, and
modifies the combustion noise rail pressure correction amount from the combustion noise rail pressure difference.

8. The engine control apparatus of claim 7, wherein the controller
extracts a combustion noise rotation speed correction amount stored in the combustion noise rotation speed map according to the engine information and the combustion pressure,
calculates a combustion noise rotation speed difference by comparing the combustion noise model value, the modified combustion noise rail pressure correction amount, and the combustion noise rotation speed correction amount, and modifies the combustion noise rotation speed correction amount from the combustion noise rotation speed difference.

9. The engine control apparatus of claim 1, wherein the controller calculates a pilot correction amount by summing the IMEP pilot correction amount and the combustion noise correction amount, calculates a combustion noise influence ratio from the IMEP correction amount and the pilot correction amount, and calculates the final pilot injection correction amount from the combustion noise influence ratio and the pilot correction amount.

10. The engine control apparatus of claim 1, wherein the controller calculates a pilot correction amount by summing the IMEP pilot correction amount and the combustion noise correction amount, calculates an IMEP influence ratio from the IMEP correction amount and the pilot correction amount, and calculates the final main injection correction amount from the IMEP influence ratio and the IMEP correction amount.

11. An engine control method comprising:

detecting engine information including an engine speed, a fuel amount, an air amount, a boost-pressure, injection timing, an intake air temperature, an atmospheric pressure, and an atmospheric temperature;

detecting combustion pressure of an engine;

performing, by a controller, IMEP control for adjusting a main injection amount and a combustion noise control for adjusting a pilot injection amount according to the engine information and the combustion pressure; and performing, by the controller, concurrent control that calculates a final main injection correction amount and a final pilot injection correction amount from an IMEP pilot correction amount and an IMEP correction amount outputted from the IMEP control and a combustion noise correction amount outputted from the combustion noise control when an IMEP control condition is satisfied;

wherein an IMEP injection correction amount learning map including an IMEP rail pressure map and an IMEP rotation speed map is stored in the controller, the IMEP control includes:

calculating an IMEP target value from the engine information;

converting the combustion pressure to an IMEP measured value;

calculating an IMEP error by comparing the IMEP target value to the IMEP measured value;

determining whether the IMEP control condition is satisfied from the engine information; and determining whether a correction amount learning condition is satisfied from the engine information, and when the IMEP control condition is satisfied and the correction amount learning condition is not satisfied, the engine control method further comprises:

calculating the IMEP correction amount by summing an IMEP rail pressure correction amount stored in the IMEP injection correction amount learning map and the IMEP rotation speed correction amount according to the engine information and the combustion pressure; and calculating the IMEP pilot correction amount by multiplying the IMEP rail pressure correction amount by a correction coefficient.

12. The engine control method of claim 11, further comprising when the IMEP control condition is satisfied and the correction amount learning condition is satisfied from the engine information and the combustion pressure:

modifying the IMEP rail pressure correction amount and the IMEP rotation speed correction amount stored in the IMEP injection correction amount learning map, and calculating an IMEP pilot correction amount and an IMEP correction amount from the modified IMEP rail pressure correction amount and the modified IMEP rotation speed correction amount.

13. The engine control method of claim 12, further comprising calculating an IMEP model value from the IMEP error, calculating an IMEP rail pressure difference by comparing the IMEP model value to the IMEP rail pressure correction amount stored in IMEP the rail pressure map, and modifying the IMEP rail pressure correction amount from the IMEP rail pressure difference.

14. The engine control method of claim 11, wherein a combustion noise injection correction amount learning map including a combustion noise rail pressure map and a combustion noise rotation speed map is stored in the controller, and the combustion noise control comprises:

calculating a combustion noise target value from the engine information;

converting the combustion pressure to a combustion noise measured value;

calculating a combustion noise error by comparing the combustion noise target value to the combustion noise measured value;

determining whether a combustion noise control condition is satisfied from the engine information; and determining whether a correction amount learning condition is satisfied from the engine information, and when the combustion noise control condition is satisfied and the correction amount learning condition is not satisfied, the combustion noise control further comprises calculating a combustion noise correction amount by summing the combustion noise rail pressure correction amount and the combustion noise rotation speed correction amount stored in the combustion noise injection correction amount learning map according to the engine information and the combustion pressure.

15. The engine control method of claim 14, wherein when the combustion noise control condition is satisfied and the correction amount learning condition is satisfied, further comprising:

modifying the combustion noise rail pressure correction amount and the combustion noise rotation speed correction amount stored in the combustion noise injection correction amount learning map; and calculating the combustion noise correction amount from the modified combustion noise rail pressure correction amount and the modified combustion noise rotation speed correction amount.

16. The engine control method of claim 15, further comprising:

calculating a combustion noise model value from the combustion noise error;

calculating a combustion noise rail pressure difference by comparing the combustion noise model value to the combustion noise rail pressure correction amount stored in the combustion noise rail pressure map; and modifying the combustion noise rail pressure correction amount from the combustion noise rail pressure difference.

17. The engine control method of claim 11, wherein the concurrent control comprises:

calculating a pilot correction amount by summing the IMEP pilot correction amount and the combustion noise correction amount;

calculating an IMEP influence ratio from the IMEP correction amount and the pilot correction amount;

calculating a combustion noise influence ratio from the IMEP correction amount and the pilot correction amount;

calculating the final pilot injection correction amount from the combustion noise influence ratio and the pilot correction amount; and calculating the final main injection correction amount from the IMEP influence ratio and the IMEP correction amount.

18. The engine control method of claim 17, wherein the final main injection correction amount is calculated by multiplying the IMEP correction amount by the IMEP influence ratio, and the final pilot injection correction amount is calculating by multiplying the pilot correction amount by the combustion noise influence ratio.

* * * * *